United States Patent [19]

Renaud, Jr. et al.

[11] 4,385,747
[45] May 31, 1983

[54] SELF-RELIEVING SEAT AND BALL VALVE INCORPORATING THE SAME

[75] Inventors: Paul Renaud, Jr., Worcester; Kenneth Paradis, Leicester, both of Mass.

[73] Assignee: Worcester Controls Corporation, West Boylston, Mass.

[21] Appl. No.: 337,904

[22] Filed: Jan. 7, 1982

[51] Int. Cl.³ ............................................. F16K 5/20
[52] U.S. Cl. .................................. 251/315; 251/175; 251/317; 251/172; 277/75
[58] Field of Search ............... 251/172, 175, 192, 315, 251/316, 317; 277/30, 75

[56] References Cited

U.S. PATENT DOCUMENTS

| | | | |
|---|---|---|---|
| 2,930,576 | 3/1960 | Sanctuary | 251/175 |
| 3,488,033 | 1/1970 | Priese | 251/172 |
| 3,556,471 | 1/1971 | Paul, Jr. | 251/315 |
| 4,134,595 | 1/1979 | Melville | 251/315 |
| 4,236,691 | 12/1980 | Wright | 251/172 |

Primary Examiner—Martin P. Schwadron
Assistant Examiner—J. R. Shay

Attorney, Agent, or Firm—Pollock, Vande Sande & Priddy

[57] ABSTRACT

An annular seat for use in a ball valve has two groups of pressure relief passageways each of which extends completely through the seat between its front and rear faces. The relief passageways in one group are located adjacent the outer periphery of the seat. The passageways in the second group are located radially inward of the passageways in the first group, and extend between the rear face of the seat and a curved sealing surface on the front face of the seat. A pair of such seats are disposed in a ball valve housing adjacent opposite sides of a rotatable ball. The interior seat support surfaces in the housing have machined recesses adjacent the central axial fluid passageway through each seat, to facilitate lip flexure of the seats. The overall arrangement provides a bidirectional valve which seals on the downstream side only of the valve, and which relieves excessive cavity pressure in the valve past the upstream seat. The seats may be provided with chamfered outer rear corners to facilitate the pressure relief operation at the upstream side of the valve under conditions of extremely rapid cavity pressure generation.

20 Claims, 5 Drawing Figures

SELF-RELIEVING SEAT AND BALL VALVE INCORPORATING THE SAME

BACKGROUND OF THE INVENTION

The present invention relates to improved seat rings for use in ball valves, and to valves incorporating the same, which are operative to relieve excess cavity pressure in the valve that, in the absence of the invention, could impair or destroy operation of the valve.

Problems which may arise when excessive pressure builds up within the cavity of a ball valve are in themselves well known to those skilled in the art, and various techniques have been suggested heretofore to eliminate or minimize such problems. One such approach has been the provision of a vent hole in the upstream side of the ball itself. This approach has the disadvantage, however, that the valve is unidirectional, and may have through leakage if the ball is installed incorrectly. Recognizing this, bidirectional valves capable of relieving excessive cavity pressure have been suggested wherein, typically, the seat rings on both sides of the valve are provided with strategically located grooves. Arrangements of this latter type are described for example in Priese U.S. Pat. No. 3,488,033, Wright U.S. Pat. No. 4,236,691, and published U.K. Patent Application GB 2023773A. These latter approaches give rise to still further problems, however, e.g., the grooves which are provided in the seat rings tend to impair their sealing functions and, in any event, are normally so arranged that excessive cavity pressure tends to be relieved entirely or in major part on the downstream side of the ball. As a result, the relief of excess cavity pressure may cause the valve to leak a quantity of hazardous or dangerous fluid from its downstream side into the atmosphere under conditions where, for purposes of safety, the valve should actually be sealing against such leakage.

In this latter respect, a ball valve may be so arranged in a pipeline that it "dead ends" the line, i.e., when the valve is opened, the fluid being controlled by the valve is emitted directly into the atmosphere. If the fluid being controlled is potentially hazardous, e.g., chlorine, and the relief of excessive cavity pressure is effected at the downstream side of the valve (rather than at the upstream side, back into an upstream pipeline, as in the present invention), the resulting release of fluid into the atmosphere may be dangerous to personnel in the vicinity. Moreover, if in such an arrangement the fluid is flammable and excessive cavity pressure within the valve occurs as a result of a fire, a pressure relief operation which involves a discharge of the flammable fluid past the downstream side of the valve into the atmosphere may increase the intensity of the fire.

The present invention obviates the foregoing problems by providing an improved seat ring, and a ball valve incorporating such seat rings, so arranged that the valve, although bidirectional, seals only on its downstream side and relieves excess cavity pressure only past the upstream side of the valve. This highly desirable mode of operation is achieved by use of a modified form of seat ring of the general type shown in Sanctuary U.S. Pat. No. 2,930,576, issued Mar. 29, 1960, for "Ball Valve". The modifications constitute, in effect, the addition of certain auxiliary relief passages appropriately located in the seat ring so as to cooperate, in a proper manner, with the relief passages already provided in that ring, along with a modification of the seat ring supporting structure within the valve housing itself adapted to permit proper flexing of the lip of the seat ring.

SUMMARY OF THE INVENTION

The ball valve of the present invention comprises a housing, a ball mounted for rotation in the housing, the ball having a flow passage extending axially therethrough in known fashion, and a pair of spaced ball valve seat rings of improved design mounted in the housing adjacent opposite sides of the ball. Each seat ring comprises an annular body of elastomeric material having a central opening therein which provides a fluid passageway extending axially through the valve for cooperation with the flow passage in the ball. The annular body has a rear face that is disposed transverse to the axial fluid passageway in the ring, a front face that extends radially outward of the fluid passageway, and an outer peripheral wall extending between the radial outermost portions of the said front and rear faces of the ring. The front face of the ring includes a curved surface which extends radially outward from the fluid passageway of the ring and which terminates in cross section in a radial outward direction at a point on the ring that is disposed radially inward of the outer peripheral wall of the seat ring.

The ring is provided with at least one first pressure relief passageway, and preferably a group of spaced such passageways, e.g., six in number, that extend completely through the annular body from the rear face thereof to the region of the front face that is located between the outer peripheral wall of the ring and the radial outward termination of the aforementioned curved surface. Such pressure relief passageways are provided in the seat rings of the aforementioned Sanctuary patent. The arrangements of those pressure relief passageways are such, however, as described in said Sanctuary patent, that pressure relief on the upstream side of the ball valve can flow in only a single direction, i.e., from the upstream pipeline past the upstream seat to the center cavity of the ball valve. Excess cavity pressure cannot be relieved in the reverse direction through the Sanctuary seat, i.e., cannot be relieved from the center cavity back to the upstream pipeline.

In accordance with the present invention, and in order to provide the reverse direction of pressure relief which is necessary in the case of excessive cavity pressure buildup, the seat ring is provided with at least one auxiliary pressure relief passageway that extends completely through the annular body of the ring from the rear face thereof to its front face, with this auxiliary pressure relief passageway being located radially outward of the central hole of the ring and radially inward of the first mentioned pressure relief passageways. The auxiliary pressure relief passageway is, more particularly, located so as to open into a curved surface, havig an unstressed radius of curvature less than that of the ball, that is provided in the front face of the seat ring and, even more particularly, opens into said curved surface at a point that is radially inward of a sealing point, in cross section, between the heel of the seat ring and its associated ball, and radially outward of a fulcrum point provided by the ball valve housing adjacent the rear face of the seat ring.

By reason of the added pressure relief passageways in the seat ring, a pressure relief path is provided through the upstream ring under conditions of excess cavity pressure, with this pressure relief path extending in sequence from the cavity of the housing through the first-mentioned (or Sanctuary) pressure relief passageway in the ring to the rear face of the ring, thence from said rear face via the auxiliary pressure relief passageway to the front face of the ring, and thence in a radially inward direction from the front face of the ring to the axial passage at the center of the ring. The relief path described, being provided at the upstream side of the ball, does not impair or interrupt the valve operation on its downstream side, and accordingly assures that a pipeline incorporating the valve will remain closed and that the discharge of fluid in the course of relieving excess cavity pressure will occur to the upstream pipeline only, where it cannot cause danger or harm.

BRIEF DESCRIPTION OF THE DRAWINGS

The foregoing objects, advantages, construction and operation of the present invention will become more readily apparent from the following description and accompanying drawings wherein.

DESCRIPTION OF THE PREFERRED EMBODIMENTS

Figure 1:
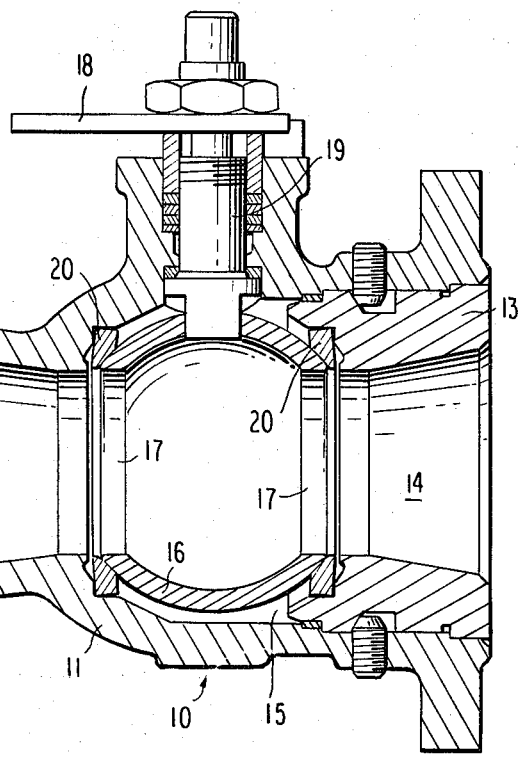
FIG. 1 is a cross-sectional view of a ball valve incorporating the improved seat rings of the present invention.

Referring initially to FIG. 1, a typical ball valve configuration of the type to which the present invention is directed (it being understood that other configurations, well known to those skilled in the art, may also make use of the invention) comprises a housing 10 consisting of a body 11 which is formed to define a fluid flow channel 12 at one end thereof. The other end of the body 11 is closed by an end plug 13 which defines a further fluid flow channel 14, and which cooperates with body 11 to define an interior cavity 15 located between channels 12 and 14. A rotary ball 16 is located within cavity 15, the ball 16 being of the so-called "floating" type, i.e., when the valve is in closed position the ball 16 is adapted to move axially in response to applied fluid pressure; and said ball 16 includes an axially directed bore whose opposing ends 17 are adapted to be disposed in alignment with, or transverse to, the axially directed fluid flow channels 12, 14 by selective rotation of the ball 16 about an axis that is transverse to the flow path through the valve. Such rotation can be effected by any of many known mechanisms, e.g., manually by means of a handle 18 that is connected by a stem 19 to the ball 16.

A pair of annular seat rings 20 are supported by housing 10 adjacent the upstream and downstream sides of ball 16 in surrounding relation to the axial flow passage through the housing. As shown in somewhat better detail, e.g., in FIG. 2, each seat ring comprises an annular body 21 of elastomeric material having a central opening 22 which provides a fluid passageway extending axially through the seat ring, and the seat ring further includes an annular rear face 23 which is disposed transverse to the axial fluid passageway. The rear face 23 can be disposed in a single substantially flat plane that extends continuously between the central opening 22 and the outermost periphery of the seat ring, as shown in full line in FIGS. 2 and 5, or, in the alternative, the seat ring can be of the so-called "champfered hole" type wherein a portion of the rear face, designated in broken line as 23a, is inclined to the remainder of the rear face in a flat or variously curved plane.

Each seat ring further includes a front face 24, the major portion of which is curved in configuration, with a radius of curvature less than that of the ball 16. This curved surface extends in a generally radial direction from a lip point 25 adjacent the central hole of the ring, to a heel point 26 that is spaced radially inward of the outermost periphery 27 of the seat ring. The seat ring further includes one or more pressure relief passageways 28, of the type shown in the aforementioned Sanctuary U.S. Pat. No. 2,930,576, that extend in a generally axial direction between the rear and front faces of the seat ring, and which open into the front face of the seat ring at a location that is disposed radially outward of the heel point 26. Relief passageway 28 can comprise a groove that is disposed adjacent the outer periphery of the seat ring and opens in an axial direction along said outermost periphery or, in the alternative, it can comprise (as shown in the aforementioned Sanctuary patent) a hole which is bored in an axial direction through the seat ring at a location radially outward of heel point 26. The purpose of pressure relief passageway 28 is described in the aforementioned Sanctuary patent, the disclosure of which is incorporated herein by reference and, briefly, functions to relieve applied fluid pressure on the upstream side of the ball in a single direction only, i.e., from the upstream side or rear face of the seat ring to the cavity 15 of the housing, thereby to break the seal between the upstream ring and the ball 16 as the ball floats in a downstream direction upon the application of fluid pressure thereto, with the ball then being sealed only on its downstream side. Inasmuch as a certain minimum flow area must be provided by passageway 28 to achieve this result, the seat typically employs a plurality of passageways of the type designated 28, e.g., six such passageways equally spaced from one another about the periphery of the seat.

As will be apparent from consideration of the discussion in the aforementioned Sanctuary patent, the location of the pressure relief passageways 28 is such that they can relieve pressure in a single direction only, i.e., toward the cavity 15 of the housing, and any increase in pressure within cavity 15 cannot be relieved by fluid flow in a reverse direction through passageways 28 due to the fact that the rear face of the seat is sealed against the ball valve housing at a location between the rear face end of passageways 28 and the central opening 22 of the seat ring. In order to effect such relief of excess cavity pressure, therefore, the present invention modifies the arrangement of the Sanctuary patent in several respects.

More particularly, as described above, the seat is provided with a curved surface on its front face that has a radius of curvature smaller than that of the ball with which the seat is associated, and which is positioned relative to the remainder of the seat in the manner previously described. The seat ring is provided with one or more auxiliary pressure relief passageways 29 that extend completely through the seat ring between the front and rear faces thereof, with each such passageway opening into the rear face of the seat ring and into the curved surface of the front face of the seat ring at points which are disposed radially inward of the extremities of passageway 28. The passageways 29 may extend in generally parallel relation to passageways 28, as illustrated in the drawings. This is not mandatory, however, and the passageways 29 may instead be non-parallel to passageways 28, extending obliquely through the seat ring between its front and back faces, e.g., as shown at 29a in FIG. 3.

The support surfaces in housing 11 that are disposed adjacent the rear faces of the seat rings are provided with annular recesses 30 of limited radial extent, each such annular recess being located in facing relation to a limited annular portion of the rear face of the ring, i.e., that portion of the ring which is next adjacent to the central opening in the seat ring, or the so-called lip portion of the ring. Recess 30 serves various purposes which will be discussed hereinafter and, briefly, defines a pivot point about which the lip portion of the ring may flex, as well as a region into which such flexure may occur.

Figure 2:
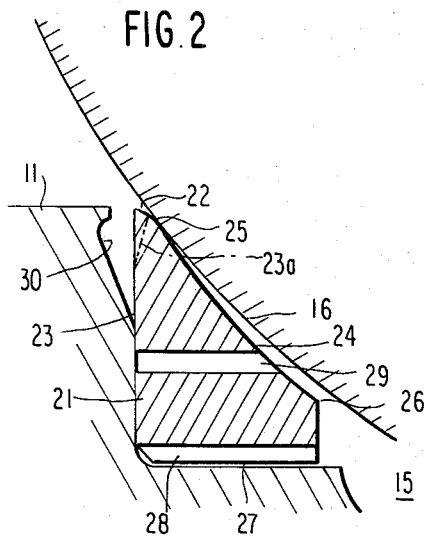
FIG. 2 is a detail view of the portion of the ball valve shown in FIG. 1, illustrating the relationship between the seat ring, the housing support surface therefore, and the ball in an initial state of assembly of the ball valve.
Figure 3:
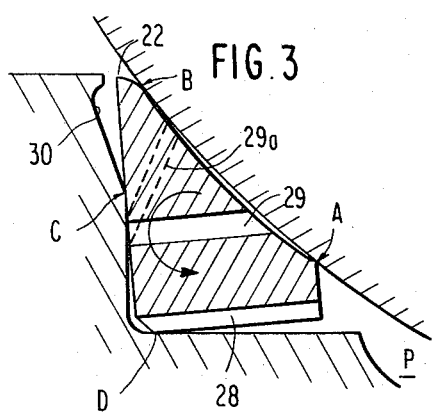
FIG. 3 is a view similar to FIG. 2 showing the housing-ball-seat relationship with no differential pressure across the valve.

Disregarding for the moment the auxiliary pressure relief passageway 29, i.e., considering the operation of a standard seat of the general type described in the aforementioned Sanctuary patent, there are three primary sealing areas in the seat, namely a sealing area A adjacent the heel of the seat, a sealing area B at the lip of the seat, and a sealing area C at the rear face of the seat (see FIG. 3). As the valve is being assembled, the first point of contact between the ball and seat is at B (as shown in FIG. 2), with this occurring before the seat is fully compressed by assembly of the valve. At this same time, as also shown in FIG. 2, the rear surface of the seat is in contact with the adjacent housing support surface.

As the valve is fully assembled, the lip of the seat (point B) is compressed by movement of the ball, and causes the seat to "wind up" (see the arrow in FIG. 3), thereby to bring the heel of the seat (point A) into contact with the ball, creating another sealing point. As the seat winds up, moreover, the rear surface of the seat rotates away from the housing support surface about pivot point C, creating a concentrated sealing point at C. By reason of this action, and due to the fact that the radius of curvature of the front face of the seat between A and B is less than the radius of curvature of the ball, the action described effects concentrated sealing bands at A and B between the seat and ball, rather than having the entire front face of the seat in contact with the ball. This reduces the frictional area between the seat and ball, resulting in lower torque being required to operate the valve.

Figure 4:
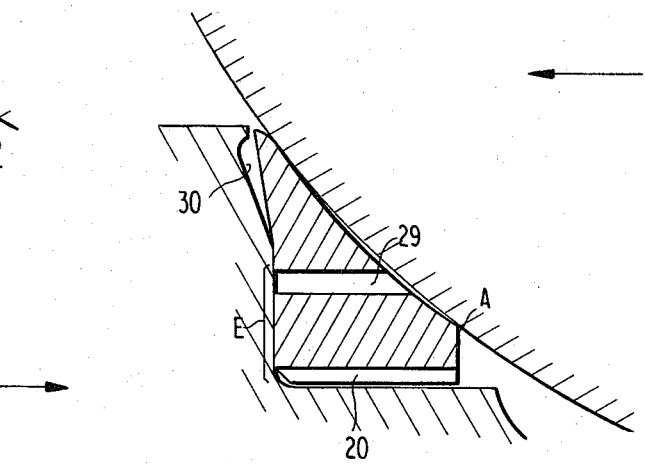
FIG. 4 is a view similar to FIG. 3 showing the relationship between the housing, ball and downstream seat with differential pressure across the valve.
Figure 5:
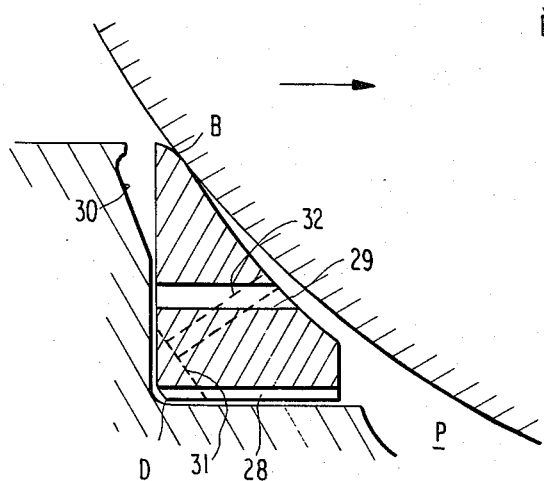
FIG. 5 depicts the relationship between the upstream seat, ball and housing with differential pressure across the valve.

When fluid pressure is applied to the valve, the increasing pressure across the valve causes ball 16 to move in a downstream direction, and the radius of curvature of the downstream seat is gradually increased to be the same as that of the ball, thereby distributing the load evenly across the face of the downstream seat to form a larger bearing area which supports the load created by the differential pressure across the valve (see FIG. 4). At the same time, as shown in FIG. 5, the upstream seat moves away from the housing as the ball moves downstream. Normally, the upstream seat would also tend to "wind up" due to the applied pressure on its rear face, and this would tend to effect a seal at point D at the outer periphery of the upstream seat. However the pressure of pressure relief passageways 28 in the seat prevent a seal from occurring at point D, and also prevent the upstream seat from winding up. As a result, contact between the ball and seat occurs only at point B on the upstream side (FIG. 5), with the result that very little torque is generated by the upstream seat. The reduction of frictional forces between the upstream seat and ball offsets some of the added torque which is required as a result of the increased face contact between the ball and downstream seat whereby, as a result, the overall valve seals on its downstream side only and the overall torque requirements of the valve are reduced.

Considering now the operation of the same valve used, for example, in so-called "fire valve" service, an increase in cavity pressure P due to increased temperature and media expansion in a fire, taken together with the fact that the seats themselves tend to soften due to increased temperature, would force both the upstream and downstream seats toward the inside diameter of the seats, i.e., toward the center axis of the housing, wedging the seats between the ball and housing at their respective points A, B and C. Because of the increased cavity pressure, and the wedging action, the seal which results at points B and C tends to become very strong and concentrated. The wedging operation and strength of the seal at B prevents cavity pressure being relieved past the front face of the seat and, although pressure relief passageways 28 are still exposed to the cavity pressure, pressure relief cannot be effected via passageways 28 and the rear face of the seat due to the strong seal which occurs at point C. As a result, cavity pressure can build up within the valve to a point where it becomes destructive of the valve or its seats, causing the release of harmful or dangerous fluids to the atmosphere.

The modified seat and associated housing structure which has been described above with reference to FIG. 2 prevents these undesirable results from occurring and permits excess cavity pressure to be relieved past the upstream seat. The modified seat still makes use of the pressure relief grooves 28 and seat wind up, but the addition of the auxiliary pressure relief passageways 29, drilled from the front face to the back face of the seat, function to redirect cavity pressure to the lip portion of the seat, allowing it to flex about the machined body step provided by recess 30, thereby relieving the excess cavity pressure.

The operation of the modified seat of the present invention, at the time of initial assembly (FIG. 2) and final assembly (FIG. 3) of the valve, remains the same as has been described earlier. When the seat is fully assembled, it seals, as before, at points A, B and C, but not at point D due to the presence of pressure relief passageways 28. The application of pressure to the valve causes the upstream seat to follow the ball downstream (FIG. 5) allowing applied pressure to go between the seat and body into the cavity 15 via pressure relief grooves 28. The ball seals on the downstream side only and, due to closure of the downstream end of groove 28 on the downstream seat against the associated support wall of the housing, pressure cannot leak in a downstream direction via the pressure relief grooves 28 in the downstream seat.

If now pressure in the cavity should increase, causing the upstream seat to assume the general configuration shown in FIG. 3, the excess pressure cannot be relieved past point A due to the seat wind up described previously. The excess pressure passes, however, through pressure relief grooves 28, from the front face to the rear face of the seat, and since the seat has now rotated away from the valve housing about point C, and the rear face end of auxiliary pressure relief passageway 29 is radially outward of said point C, the pressure which is applied via pressure relief passageways 28 to the rear face of the seat now passes in an axially forward direction through auxiliary pressure relief passageways 29 to the front face of the seat. This pressure is now directed in a radially inward direction along the forward face of the seat toward the lip seal at point B; and since the lip provides a relatively weak unsupported seal at B, the pressure applied thereto from the forward face of the seat causes the lip to flex in a reverse direction toward recess 30, thereby allowing the excess pressure to "burp" back into the pipeline proper. This operation will normally occur toward the upstream side of the valve only, as the upstream seat is the least stressed of the two seats.

In this latter respect, and considering the condition of the downstream seat (FIG. 4) the differential pressure applied across the valve moves the ball into forcible contact with the front face of the downstream seat, causing the lip of the seat to flex in a forward direction toward recess 30. At the same time, the rear surface of the seat is moved forcibly into contact with the adjacent seat support surface of the housing 10, to effect a seal between the rear face of the downstream seat and the housing over a comparatively wide sealing band E. Inasmuch as the ball is in engagement with the downstream seat at point A and for all or a significant portion of the front face of the downstream seat extending radially inward of point A, cavity pressure cannot leak in a downstream direction past the front face of the seat. By the same token, since the rear face of the seat is in sealing engagement with the housing over the comparatively wide band E, which extends in a radial direction past the downstream ends of both of relief passages 28 and 29, cavity pressure even though applied to passageway 28 cannot be relieved past the downstream side of the seat. Accordingly, any buildup of cavity pressure does not impair the seal between the ball and its downstream seat, and excess cavity pressure is relieved only past the upstream seat and back into the upstream pipeline.

The machined configuration of annular groove 20 in the housing provides an accurately positioned fulcrum point about which the lip portion of the seats may flex upon an application of a pressure differential to the ball valve, and, in addition, allows the downstream seat to flex without being crushed against the adjacent housing wall when differential pressure is applied across the valve. Moreover, the machined configuration of annular groove 30 provides a secondary "fire-lip" on the body port adjacent the downstream side of the valve, to effect a supplementary seal at the downstream side if, during a fire, the seal ring on the downstream side should fail.

Only a single auxiliary pressure relief passageway 29 need be provided to effect the cavity pressure relief operation described above. However it is preferred that a plurality of such passageways 29 be provided, e.g., three such passageways spaced 120° from one another about the center axis of the seat. In this respect, if the medium flowing through the valve has the capability of solidifying in the bottom of the valve, and only one passageway 29 is provided in the seat ring, the flowing medium might plug that single passageway in the course of normal operation of the valve and thereby impair the cavity pressure relief capability of the seat. This potential difficulty is avoided by providing a plurality of spaced passageways 29, as described. The number of such passageways 29 is, in a preferred embodiment of the invention, less than the number of passageways 28, i.e., six passageways 28 and only three passageways 29 can be provided in a typical embodiment of the invention.

Under extremely rapid cavity pressure generation (5,000 PSI with 90 seconds), which can occur under fire test conditions, the embodiments of the invention thus far described may not be sufficient to prevent damage to the ball valve. At 4,000 PSI, nominally, mechanical damage occurs to the ball and body; and if the seat can eject below that limit, the valve remains mechanically capable of passing the fire test. Accordingly, to meet these more severe requirements, the valve seats are preferably modified in configuration as shown in broken line in FIG. 5 (it being understood that both seats would have such configuration) so as to provide a means for ejecting the upstream seat radially inward.

The modification comprises providing a large chamfer 31 at the outer rear corner of the seat, and directing the auxiliary pressure relief passageways angularly from the chamfered face 31 to the front face of the valve seat, as shown at 32. The addition of a large chamfer at the outer rear corner of the seat helps in two ways. First, it reduces the mass of material in this particular region of the seat, thereby reducing the tendency of the seat to jam under the conditions specified. Moreover, under fire conditions the seats soften and then burn out; and with the chamfer 31 present, there is more rapid ball movement downstream toward the secondary seal. This movement provides more clearance for the upstream seat to escape between the ball and body by either fracturing or deforming.

Auxiliary relief passageways 32 are oriented at an angle which varies with valve size, cavity design, etc., and in some embodiments of the invention can originate at the rear face of the seat and extend inwardly therefrom in a manner generally similar to that shown at 29a in FIG. 3. However in valves of larger size, the auxiliary relief passageways 32 must originate on the chamfer 31 as shown in FIG. 5, due simply to lack of space.

While we have thus described preferred embodiments of the present invention, many variations will be apparent to those skilled in the art. It must therefore be understood that the foregoing description is intended to be illustrative only and not limitative of the present invention, and all such variations and modifications as are in accord with the principles described are meant to fall within the scope of the appended claims.

Having thus described our invention, we claim:

1. A seat ring for a ball valve adapted to seal against a ball in the valve, said seat ring comprising an annular body of elastomeric material having a fluid passageway centrally located therein and extending axially therethrough, said annular body having a rear face, a front face spaced from said rear face and extending radially outward of said fluid passageway, and an outer peripheral wall extending between the radial outermost portions of said front and rear faces, said front face including a curved surface which extends radially outward from said fluid passageway and which terminates in cross section in a radial outward direction at a point that is disposed radially inward of said outer peripheral wall, at least one first pressure relief passageway extending completely through said annular body from the rear face thereof to the region of said front face between said outer peripheral wall and the radial outward termination of said curved surface, and at least one second pressure relief passageway extending completely through said annular body from the rear face of said body to a region of said curved surface located between said axial fluid passageway and the radial outward termination of said curved surface.

2. The seat ring of claim 1 werein a plurality of said second pressure relief passageways extend completely through said body in spaced relation to one another.

3. The seat ring of claim 2 wherein said annular body is provided with three of said second pressure relief passageways spaced 120° from one another about the axis of said body.

4. The seat ring of claim 2 wherein a plurality of said first pressure relief passageways extend completely through said body in spaced relation to one another.

5. The seat ring of claim 4 wherein the number of said first pressure relief passageways exceeds the number of said second pressure relief passageways.

6. The seat ring of claim 1 wherein said first and second pressure relief passageways extend in substantially axial directions through said body.

7. The seat ring of claim 6 wherein said first and second pressure relief passageways are disposed at an acute angle to one another.

8. The seat ring of claim 1 wherein said first pressure relief passageway comprises a groove which is located adjacent to the outer periphery of said annular body and which opens in an axial direction into said outer peripheral wall.

9. The seat ring of claim 1 wherein said curved surface has a radius of curvature that is smaller than the radius of curvature of the valve ball with which said seat ring is intended to cooperate.

10. The seat ring of claim 1 wherein at least a portion of said rear face is disposed in a single substantially flat plane between said axial fluid passageway and the outer periphery of said annular body.

11. The seat ring of claim 1 wherein the outer rear corner of the seat, at the junction between said rear face and said outer peripheral wall, exhibits a comparatively large chamfer.

12. The seat ring of claim 11 wherein said second pressure relief passageway extends from said chamfer to said front face of said seat ring.

13. The seat ring of claim 1 wherein said rear face includes a portion which is oriented in a first plane extending generally radially from the outer periphery of said annular body to a location on said annular body that is radially inward of the opening into said rear face of said second pressure relief passageway, said rear face also including a further portion which is oriented in a plane that is inclined to said first plane and extends from said location on said annular body to said axial fluid passageway.

14. In a ball valve of the type comprising a housing having an interior cavity located between and communicating with a pair of fluid flow channels to define an axial flow passage extending through said housing, a ball located in said cavity, said ball having an axially directed bore extending therethrough, said ball being mounted for rotation about an axis of rotation transverse to said flow passage whereby its said bore may be selectively aligned with or disposed transverse to the axial flow passage in said housing to control the flow of fluid therethrough, and a pair of annular seat rings supported by said housing in surrounding relation to said axial flow passage adjacent the upstream and downstream sides of said cavity respectively for sealing engagement with said housing and ball, each said ring including at least one pressure relief passageway extending in an axial direction completely therethrough between the front and rear faces of the ring at a location in said seat ring located radially outward of the regions of sealing engagement of said ring to said ball and housing, the improvement wherein each of said seat rings includes at least one auxiliary pressure relief passageway extending completely therethrough between the front and rear faces of the ring, one end of said auxiliary pressure relief passageway being located at a region of the front face of said seat ring that is radially inward of the outermost extremity of the region of sealing engagement between the front face of said ring and said ball, the other end of said auxiliary pressure relief passageway being located at a region of the rear face of said seat ring that is radially outward of the region of sealing engagement between the rear face of said ring and said housing, said seat rings and their respective pressure relief passageways being so positioned and dimensioned relative to one another and to said housing and ball that, upon occurrence of excess cavity pressure in said housing, said excess pressure is relieved past the upstream one of said seat rings via a pressure relief path which extends in sequence from the cavity in a generally axial direction through the first-mentioned pressure relief passageway of said upstream seat ring to the rear face of said ring, thence from the rear face of said ring in a generally axial direction via said auxiliary pressure relief passageway to the front face of said upstream seat ring, and thence in a radially inward direction to the central opening of said annular upstream seat ring and to the upstream one of the fluid flow channels in said housing.

15. The ball valve of claim 14 wherein the front face of each of said annular seat rings includes a curved surface whose radius of curvature is smaller than the radius of curvature of said ball in the unstressed configuration of said seat ring, the curved surface extending in a generally radial direction from a first point adjacent the central opening of said annular seat ring to a second point that is radially inward of the outer periphery of said ring, said first-mentioned pressure relief passageway opening into the front face of said ring at a location between said second point and the outer periphery of said ring, and said auxiliary pressure relief passageway opening into said front face of said ring at a location between said first and second points.

16. The ball valve of claim 15 wherein the housing of said valve includes a pair of generally radial support surfaces located adjacent the rear faces of said pair of seat rings respectively, each of said support surfaces including an annular recess of limited radial extent located in facing relation to a limited annular portion of each said rear face that is next adjacent to the central opening in said seat ring.

17. The ball valve of claim 16 wherein said auxiliary pressure relief passageway opens into the rear face of said seat ring at a location that is located radially outward of the annular recess in the housing support surface associated with said seat ring.

18. The ball valve of claim 16 wherein at least part of said limited annular portion of the rear face of each said seat ring is disposed in a plane that is inclined to the radial direction.

19. The ball valve of claim 14 wherein each said seat ring is provided with a chamfer at the corner thereof between said rear face and the outermost peripheral wall of said seat ring.

20. The ball valve of claim 19 wherein said auxiliary pressure relief passageway originates at said chamfer and extends therefrom to the front face of the seat ring at an acute angle to the central axis of said ball valve.

* * * * *